United States Patent [19]
Vockenhuber

[11] 4,198,129
[45] Apr. 15, 1980

[54] VARIFOCAL LENS SYSTEM WITH THREE MOVING COMPONENTS

[75] Inventor: Peter Vockenhuber, Grandson, Switzerland

[73] Assignee: Bolex International S.A., Ste-Croix, Switzerland

[21] Appl. No.: 897,722

[22] Filed: Apr. 19, 1978

[30] Foreign Application Priority Data

Apr. 21, 1977 [CH] Switzerland .............. 4939/77

[51] Int. Cl.² .................. G02B 15/14; G02B 7/10
[52] U.S. Cl. .................... 350/187; 350/184
[58] Field of Search ............... 350/187, 186, 184

[56] References Cited

U.S. PATENT DOCUMENTS

| | | | |
|---|---|---|---|
| 2,778,272 | 1/1957 | Reymond | 350/184 |
| 3,051,052 | 8/1962 | Bergstein | 350/184 |
| 3,192,829 | 7/1965 | Yamaji | 350/187 |

FOREIGN PATENT DOCUMENTS

| | | | |
|---|---|---|---|
| 2161996 | 7/1973 | Fed. Rep. of Germany | 350/184 |
| 995429 | 6/1965 | United Kingdom | 350/184 |

*Primary Examiner*—Jon W. Henry
*Attorney, Agent, or Firm*—Montague & Ross

[57] ABSTRACT

An optical objective of variable focal length comprises a varifocal front lens group consisting of at least four components of alternating refractivity, namely a stationary negative first component, a movable positive second component, a movable negative third component and a movable positive fourth component. The second component is linearly displaceable, over the entire varifocal range, between a wide-angle position and a telephoto position. The third component remains stationary over several subranges ($\beta$), during which the image plane of the objective passes once or twice through a zero position, but moves parallel to the second component in intervening range segments ($\gamma$). The fourth component moves parallel to the second component over the whole range except in two terminal zones ($\alpha$) at the wide-angle and telephoto ends. A reversal of the image-plane excursion occurs in each of the terminal and intervening range portions ($\alpha$, $\gamma$), yielding additional zero positions. The intermittent entrainment of the third and fourth components by the second component can be brought about by cams, by a mechanical linkage of the lost-motion type, or by stepping motors under the control of a microprocessor.

10 Claims, 11 Drawing Figures

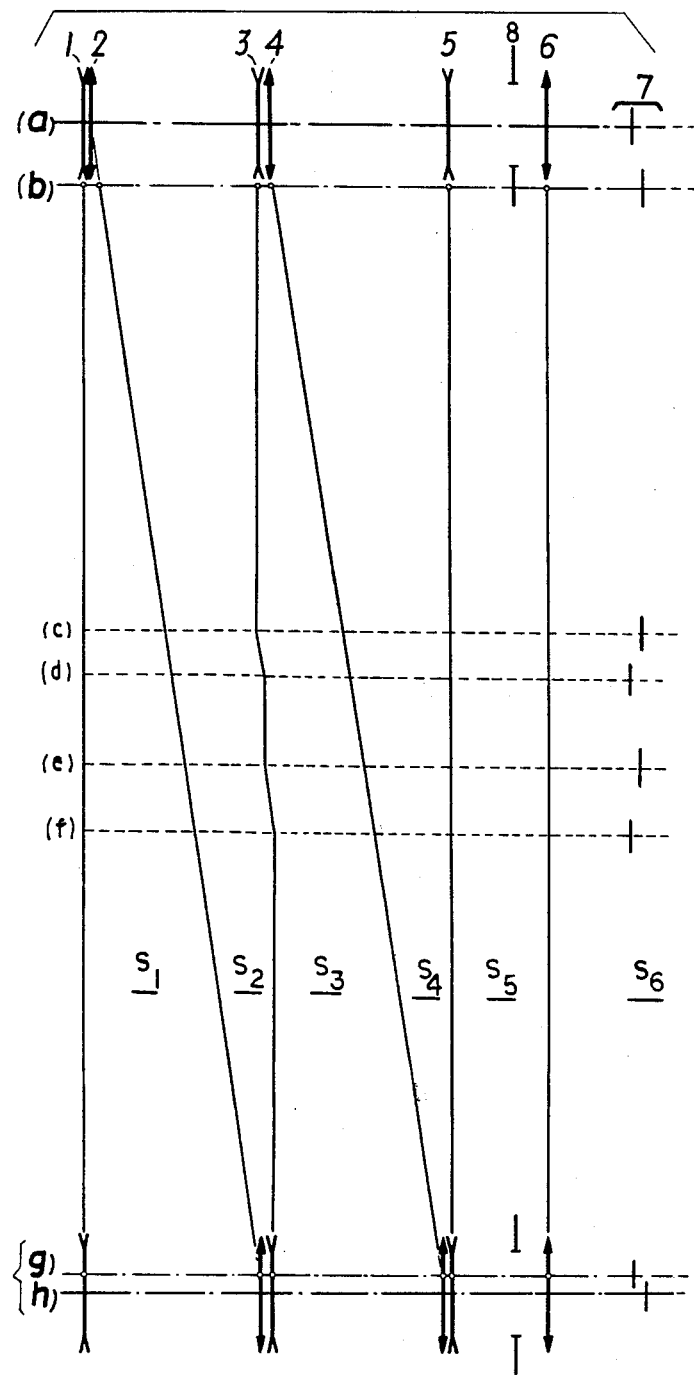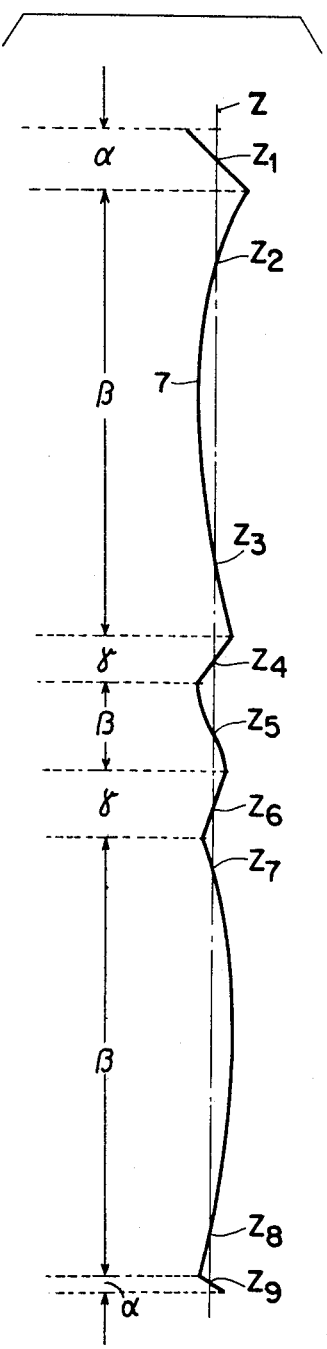

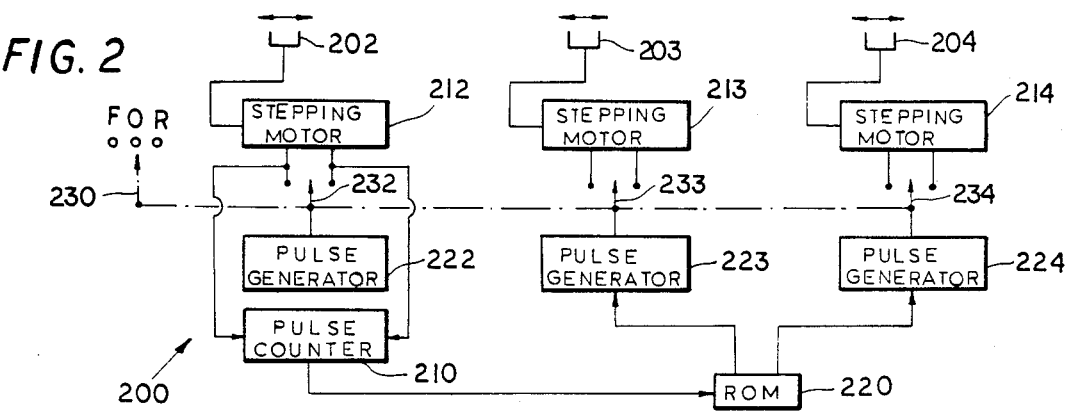
FIG. 2
FIG. 8
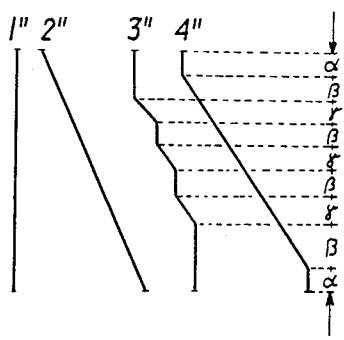
FIG. 9
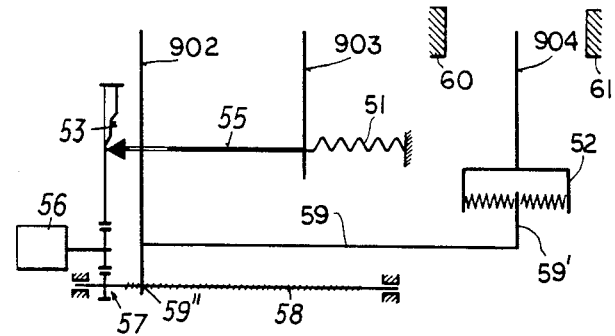
FIG. 10
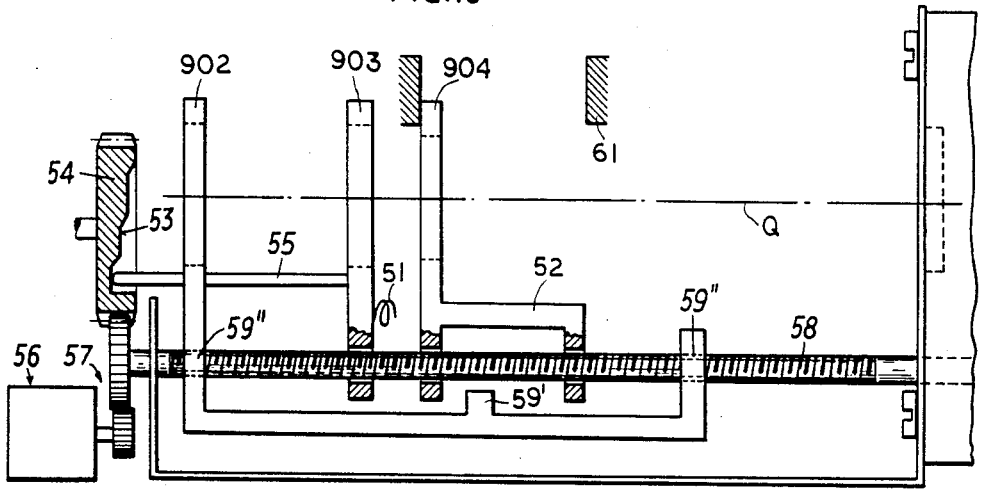

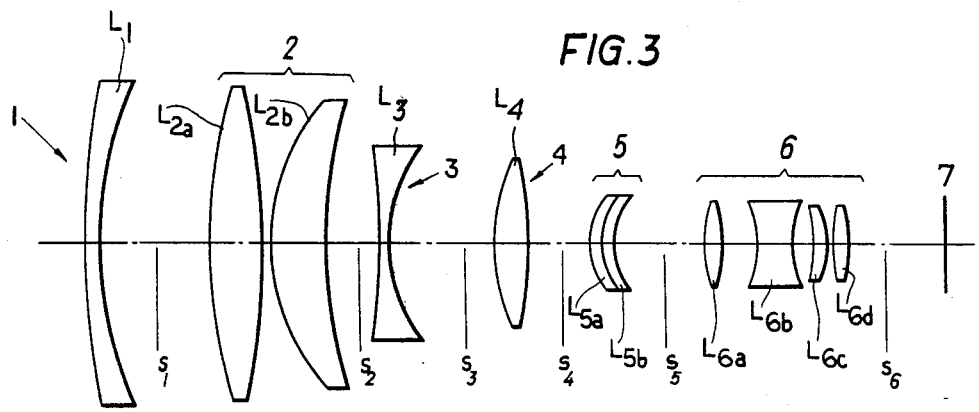
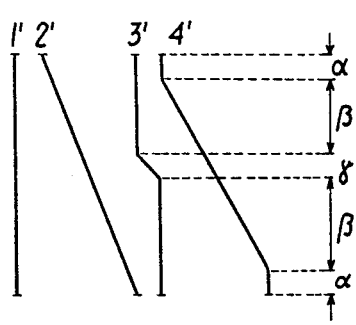
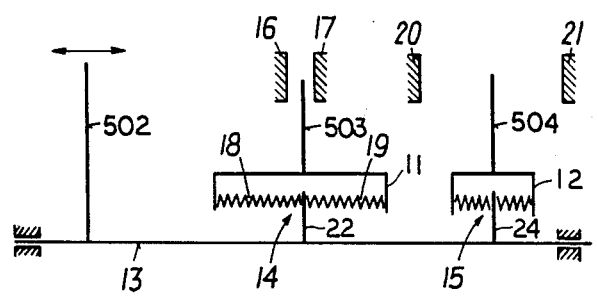
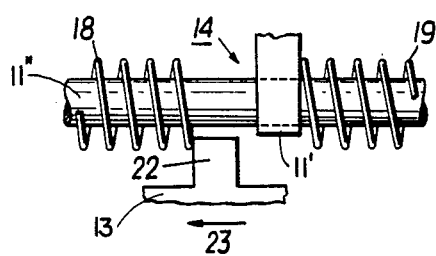
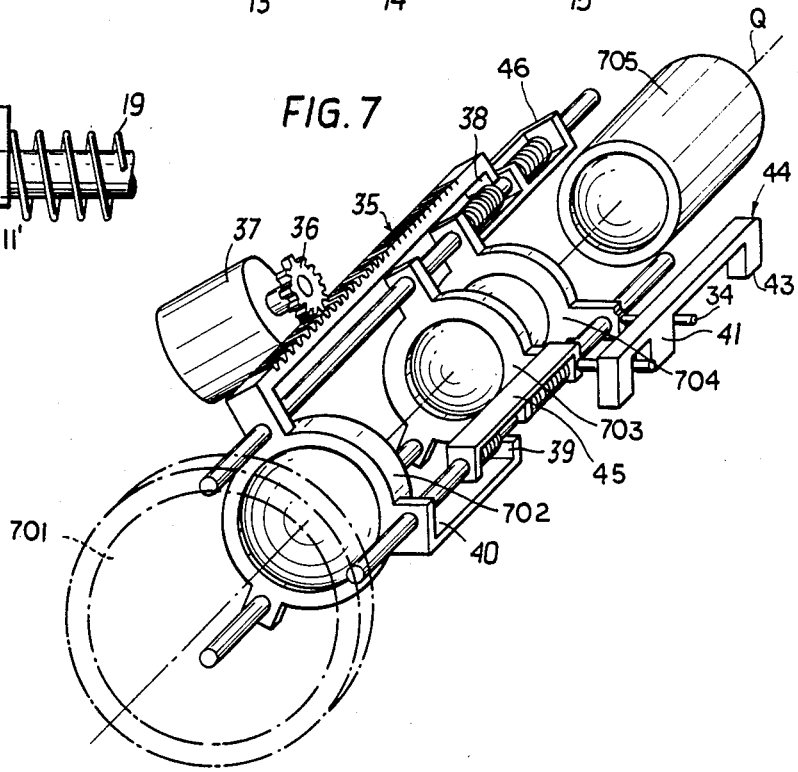

VARIFOCAL LENS SYSTEM WITH THREE MOVING COMPONENTS

FIELD OF THE INVENTION

My present invention relates to an optical system and more particularly to an objective of variable focal length for a photographic or cinematographic camera.

BACKGROUND OF THE INVENTION

So-called zoom or pancratic objectives of this type generally consist of two distinct lens groups, namely a varifocal front group (often designed as a separate, usually afocal attachment) and a fixed-focus rear or relay group. The varifocal front group comprises a plurality of components including a front component, considered stationary though it may be limitedly axially shiftable for focusing purposes, and at least two axially movable components. The more forwardly positioned movable component or variator, whose refractivity type is generally opposite that of the stationary front component, is linearly shiftable throughout the varifocal range whereas the other movable component, of the same refractivity type, is designed to compensate for excursions of the image plane of the objective due to the shifting of the variator. In order to maintain that image plane in a predetermined position (referred to hereinafter as a zero position) coincident with a receiving surface, such as that of a photosensitive film, the second movable component must generally carry out a nonlinear shift throughout the varifocal range. Thus, conventional objectives of this type have to be provided with accurately machined cam tracks controlling the shifts of these movable components relative to the remaining lenses.

Optical systems are known in which the concurrent parallel shifting of two nonadjacent components of a varifocal group, having the same refractivity type, results in a nearly stationary image plane with three or four zero crossings; see, for example, U.S. Pat. Nos. 2,778,272 and 3,051,052. The varifocal range of such a system is more or less limited to the region extending from the first to the last zero crossing since the deviation of the image plane increases rapidly beyond these points.

U.S. Pat. No. 3,192,829 discloses an optical system in which the second and fourth components of a varifocal group are ganged for concurrent linear displacement while the interposed third component, of opposite refractivity type, carries out a nonlinear motion in order to compensate for the resulting excursions of the image plane. It has also been proposed (see, for example, German published specification No. 2,437,652) to drive the shiftable lens members of a varifocal group by means of a common leadscrew threads of one pitch for an axially displaceable variator component and threads of a different pitch for the compensator component. A difficulty encountered with a system of the latter type is that, for proper stabilization of the image-plane position, the compensator must move only over short distances so that a step-down linkage is required between that component and the leadscrew.

OBJECTS OF THE INVENTION

The general object of my present invention, therefore, is to provide a varifocal lens group whose axially movable components can all be linearly shifted while providing a larger number of zero crossings than are obtainable with conventional systems of the optically compensated type operating without cam drives or the like.

A related object is to extend the varifocal range of such a linearly shiftable system beyond its conventional limits.

SUMMARY OF THE INVENTION

I have found, in accordance with the present invention, that these objects can be realized by so coupling the second, third and fourth components of a varifocal front lens group with an associated zooming drive that the third component, i.e. the compensator, is shifted only intermittently, at a linear rate, while remaining stationary in a plurality of subranges of the overall varifocal range. These subranges, in each of which the image plane occupies its zero position at least once, are separated by one or more intervening range segments each containing a zero crossing resulting from the linear shifting of the third component in that range segment. The second and fourth components (i.e. the variators) are continuously displaceable, parallel to each other, in at least a major part of the varifocal range encompassing the aforementioned subranges and intervening range segment or segments. In the following description, I shall refer to the several subranges as zones $\beta$ and to the intervening range segments as zones $\gamma$.

Advantageously, the axial shifting of the third component or compensator in each zone $\gamma$ is carried out at the same rate as that of the two variator components, thus allowing the use of a common drive member such as a rack or a constant-pitch leadscrew for their displacement as more fully discussed hereinafter.

Pursuant to a more particular feature of my invention, one of the two variator components—preferably the second component—is coupled with the zooming drive for further axial displacement in one or two terminal zones, hereinafter referred to as zones $\alpha$, in which the two other movable components are stationary. Each terminal zone encompasses an additional zero crossing, with resulting extension of the overall varifocal range.

The intermittent shift of the third or compensator component and possibly one of the two variator components, preferably the fourth, can be carried out by simple mechanical means such as a lost-motion linkage. Even if a cam drive is used, its design is significantly simplified on account of the linear displacement of the controlled component or components. The shiftable components could, however, also be controlled electronically, with the aid of a digital miniprocessor generating pulse trains for the energization of respective stepping motors.

BRIEF DESCRIPTION OF THE DRAWING

The above and other features of my invention will now be described in detail with reference to the accompanying drawing in which:

FIGS. 1A and 1B are diagrammatic representations of a varifocal objective embodying my invention, illustrating the displacement of its movable components and the positions of its image plane;

FIG. 2 is a circuit diagram of an electronic zoom-control unit serving to displace the movable components of such a system;

FIG. 3 illustrates a specific lens assembly for an objective according to my invention;

FIG. 4 is a diagram similar to FIG. 1A, representing a modified law of displacement of the movable components;

FIG. 5 is a schematic representation of a lost-motion linkage designed to implement the law of displacement of FIG. 4;

FIG. 6 is an enlarged detail view of part of the linkage of FIG. 5;

FIG. 7 is an axonometric view of a camera objective provided with the type of linkage schematically illustrated in FIGS. 5 and 6;

FIG. 8 is a diagram similar to FIG. 4, representing still another law of displacement;

FIG. 9 is a view similar to FIG. 5, relating to the diagram of FIG. 8; and

FIG. 10 shows details of a cam drive used in the system of FIG. 9.

SPECIFIC DESCRIPTION

In FIG. 1A I have schematically depicted, by conventional lens symbols, an optical objective of variable focal length which comprises a varifocal front attachment, consisting of components 1–5, and a fixed-focus rear lens group collectively designated 6. The two lens groups 1–5 and 6 are separated by a diaphragm 8. The position of the image plane has been indicated at 7. The excursions of that image plane with reference to a zero position Z, coinciding with a receiving surface, have been exaggeratedly illustrated in FIG. 1B. Both these Figures show a varifocal range extending from a telephoto end, line (a), to a wide-angle end, line (h).

As indicated in FIG. 1B, this varifocal range is divided into two terminal zones $\alpha$, defined by lines (a) and (b) at the telephoto end and by lines (g) and (h) at the wide-angle end; several subranges $\beta$, lying between lines (b) and (c), (d) and (e), (f) and (g); and two intervening range segments $\gamma$ bounded by lines (c) and (d) on the one hand and (e) and (f) on the other hand.

The first component 1, of negative refractivity, is stationary throughout the range except for possible focusing adjustment unrelated to focal length. The second component 2, of positive refractivity, moves linearly over the entire range from line (a) to line (h). The negative third component 3 is stationary in all zones $\alpha$ and $\beta$ but moves parallel to component 2 in zones $\gamma$. The positive fourth component 4 is stationary in terminal zones $\alpha$ but moves linearly, parallel to component 2, between lines (b) and (g). Components 5 (negative) and 6 (positive) are axially fixed.

From FIG. 1B it will be noted that the image plane 7 crosses the zero position Z at $Z_1$ in the upper zone $\alpha$, at $Z_2$ and $Z_3$ in the adjoining zone $\beta$, at $Z_4$ in the upper zone $\gamma$, at $Z_5$ in the middle zone $\beta$, at $Z_6$ in the lower zone $\gamma$, at $Z_7$ and $Z_8$ in the lower adjoining zone $\beta$, and at $Z_9$ in the lower zone $\alpha$. Between these zero-crossing points, and throughout the entire range, the image-plane excursions are well within the acceptable depth-of-field limits.

In FIG. 2 I have shown a microprocessor 200 serving to control the motion of components 2, 3 and 4 by digital circuitry. These movable components are held in lens mounts schematically indicated at 202, 203, 204 and driven by bidirectional stepping motors 212, 213, and 214, respectively. Each stepping motor is energizable by the output of an associated pulse generator 222, 223, 224 which can be connected to a forward-driving input or a reverse-driving input with the aid of respective arms 232, 233, 234 of a selector switch 230 shown in its neutral position O. In forward position F, or in reverse position R, the pulses emitted by generator 222 are also delivered to a respective input of an up/down binary counter 210 addressing a read-only memory 220. When the reading of pulse counter 210 has a value corresponding to one of the zones $\gamma$, memory 220 actuates the pulse generator 223 to displace the lens mount 203 by means of motor 213. If the reading corresponds to a zone $\beta$ or $\gamma$, generator 224 is operated and energizes the motor 214 to shift the lens mount 204 at the same rate at which the lens mount 202 is displaced by stepping motor 212 under the control of pulse generator 222. In this case, stepping motor 213 need not necessarily operate at the speed of motors 212 and 214. In a simplified microprocessor, however, I may use only the pulse generator 222 and replace the other two generators by AND gates or equivalent logical circuitry selectively blocking and unblocking the transmission of its pulse train to motors 213 and 24 under the control of memory 220.

FIG. 3 shows a preferred physical realization of the objective 1–6 schematically indicated in FIG. 1A. Front component 1 is a singlet $L_1$ in the form of a negative meniscus. Variator component 2 consists of two air-spaced lenses, namely a biconvex singlet $L_{2a}$ and a positive meniscus $L_{2b}$. Components 3 and 4 are singlets in the form of a biconcave lens $L_3$ and a biconvex lens $L_4$, respectively. Component 5 is a doublet of negative refractivity formed by two cemented menisci $L_{5a}$ and $L_{5b}$. Component 6 consists of four air-spaced lenses $L_{6a}$ (positive), $L_{6b}$ (negative) and $L_{6c}$, $L_{6d}$ (positive). In FIGS. 1A and 3, the spaces separating the several components 1–6 from one another, and from image plane 7, has been designated $s_1$–$s_6$.

Representative values of the radii of curvature, thicknesses and separations (including air spaces $s_1$–$s_6$), as well as refractive indices $n_d$ and Abbé numbers $\nu_d$, have been given in the following Table A. The numerical values for the variable air spaces $s_1$–$s_4$, omitted in Table A, are listed in Table B for a number of representative points throughout the varifocal range, these points corresponding to different focal lengths $f_A$–$f_G$. As will be apparent from these values, focal length $f_A$ lies in the upper zone $\alpha$ of FIG. 1A where $s_2+s_3=15.37$, exceeding the value of 15.14 given in the other columns of the table. Focal lengths $f_B$, $f_C$ and $f_D$ are measured at points lying in the upper zone $\beta$ where $s_1+s_2$ has substantially the same value of 14.63 as at point $f_A$. Focal length $f_E$, for which $s_1+s_2=14.95$, lies in the middle zone $\beta$ whereas focal lengths $f_F$ and $f_G$ (with $s_1+s_2=15.18$ or 15.19) are found in the lower zone $\beta$. With $s_1$ and $s_4$ close to zero for $f=f_A$ and $f=f_G$, respectively, these two points lie near the telephoto end and the wide-angle end of the range. Thus, the system given by Tables A and B has a varifocal ratio of almost 3:1.

The measured back-focal distance $s_6$ is 8.77 for all the points listed in Table B, except at $f_a$, where $s_6=8.76$, and at $f_D$, where $s_6=8.78$.

TABLE A

|  | radii | thicknesses and separations | $n_d$ | $\nu_d$ |
|---|---|---|---|---|
| $L_1$ | + 581.26 <br> + 43.68 | 1.25 | 1.781 | 37.09 |
|  |  | $s_1$ = variable |  |  |
| $L_{2a}$ | + 50.39 <br> − 93.22 | 4.85 | 1.607 | 59.46 |

TABLE A-continued

| radii | thicknesses and separations | $n_d$ | $v_d$ |
|---|---|---|---|
| | 0.09 | | |
| $L_{2b}$ ( +21.86 / +52.60 | 4.85 | 1.607 | 59.46 |
| | $s_2$ = variable | | |
| $L_3$ ( −57.22 / +20.805 | 0.80 | 1.788 | 47.39 |
| | $s_3$ = variable | | |
| $L_4$ ( +24.71 / −48.55 | 3.12 | 1.487 | 70.41 |
| | $s_4$ = variable | | |
| $L_{5a}$ ( +8.075 | 1.00 | 1.517 | 52.20 |
| $L_{5b}$ ( +5.64 / +5.96 | 1.71 | 1.518 | 65.05 |
| | $s_5$ = 8.10 | | |
| $L_{6a}$ ( +16.0 / −16.0 | 1.90 | 1.693 | 53.33 |
| | 3.75 | | |
| $L_{6b}$ ( −8.69 / +17.90 | 3.40 | 1.728 | 28.41 |
| | 2.20 | | |
| $L_{6c}$ ( −14.44 / −7.90 | 1.70 | 1.696 | 56.18 |
| | 0.10 | | |
| $L_{6d}$ ( +33.00 / −21.60 | 1.22 | 1.696 | 56.18 |
| | $s_6$ = 8.77 | | |

TABLE B

| f | $f_G$ 12.19 | $f_F$ 17.51 | $f_E$ 20.50 | $f_D$ 22.55 | $f_C$ 26.69 | $f_B$ 31.82 | $f_A$ 34.50 |
|---|---|---|---|---|---|---|---|
| $s_1$ | 15.10 | 10.07 | 7.72 | 6.14 | 3.79 | 1.28 | 0.02 |
| $s_2$ | 0.09 | 5.11 | 7.23 | 8.49 | 10.84 | 13.36 | 14.61 |
| $s_3$ | 15.05 | 10.03 | 7.91 | 6.65 | 4.30 | 1.78 | 0.76 |
| $s_4$ | 0.80 | 5.83 | 8.19 | 9.76 | 12.11 | 14.62 | 15.65 |

The numerical values for the radii, thicknesses, separations and focal lengths are specifically given in millimeters but could, of course, be modified proportionally. In some instances it may be desirable to provide the object-side surface of front lens $L_1$, represented by the first radius of Table A, with an aspherical curvature.

In FIG. 4, where the relative positions of components 1-4 are represented by lines 1', 2', 3' and 4', I have known a somewhat simplified law of displacement with but one zone γ in which component 3 undergoes axial shifting. A mechanism for controlling the displacement of components 3 and 4 in conformity with FIG. 4 is schematically illustrated in FIG. 5 where the lens mounts of components 2, 3 and 4 have been symbolized by lines 502, 503 and 504. Lens mount 502 is positively coupled with a drive member 13 carrying two extensions 22 and 24. A bracket 11, rigid with lens mount 503, is shiftable between two limiting positions constituted by fixed stops 16 and 17, these positions corresponding to the sections of line 3' (FIG. 4) above and below zone γ. Extension 22 is coupled with bracket 11 via a lost-motion linkage 14 comprising a pair of compression springs 18 and 19 (see also FIG. 6). In an analogous manner, lens mount 504 is rigid with a bracket 12 coupled with extension 24 by a similar lost-motion linkage 15, this lens mount being displaceable between end stops 20 and 21 which define the positions of the vertical sections of line 4' (FIG. 4) in zones α.

The centered position of drive member 13 illustrated in FIG. 5 corresponds to an intermediate part of the varifocal range, lying midway in zone γ of FIG. 4. With lens mounts 503 and 504 unrestrained by the associated stops, brackets 11 and 12 are entrained through their counteracting springs at the speed of member 13 so that the three lens mounts 502-504 move in unison. If the movement is to the left, for example, stop 16 arrests lens mount 503 at the upper limit of zone γ while the other lens mounts continue their axial shift until lens mount 504 is intercepted by stop 29 at the boundary of upper zones α and β. In the case of a rightward displacement, lens mounts 503 and 504 are successively arrested by stops 17 and 21.

FIG. 6 shows a lug 11' rigid with bracket 11 secured to a rod 11" which supports the coil springs 18 and 19. Coupling element 22, which in its centered position is aligned with that lug and is of the same width, is here shown shifted to the left (arrow 23) to compress the spring 18 as the lens mount 503 is held back by stop 16 (FIG. 5). Lug 11' holds the two springs 18 and 19 under a certain initial compression within bracket 11 in order to prevent any disalignment from coupling element 22 as long as the associated lens mount is not in contact with either of its stops. The same construction can, of course, be used for the linkage 15 shown in FIG. 5.

Member 13, although here shown as a rod or bar integral with coupling elements 22 and 24, could also be a leadscrew in which case elements 22 and 24 as well as lens mount 502 would be designed as nuts engaging that screw; such an arrangement has been illustrated in FIG. 10 described hereinafter.

In the embodiment of FIG. 7 the movable lens mounts, centered on an optical axis Q, have been designated 702, 703 and 704. A coaxial lens mount 701, carrying the front component 1 of FIG. 1A, has been indicated only in phantom lines. The stationary components 5 and 6 of FIG. 1A are housed in a lens barrel 705 also centered on axis Q.

The drive for the movable lens mounts is here shown as comprising a rack 35 meshing with a pinion 36 on a reversible zoom motor 37. Rack 35 carries coupling formations 38 and 39 which coact with brackets 45, 46 via spring couplings as described above with reference to brackets 11 and 12. Coupling formation 39 forms part of an extension 40 of rack 35 integral with lens mount 702. Brackets 45 and 46 are integral with lens mounts 703 and 704, respectively, and are provided with pins 33 and 34 flanked by teeth 41, 42 and 43 of a fixed abutment member 44, these teeth being the counterparts of stops 16, 17, 20 and 21 shown in FIG. 5. The operation of the system of FIG. 7 is therefore analogous to that discussed above.

In FIG. 8 I have indicated at 1"-4" the positions of components 1-4 according to yet another law of motion. In this instance the major part of the varifocal range, between the two terminal zones α, is subdivided into four subranges β with three intervening range segments γ. The shifting of the fourth component, as illustrated schematically in FIG. 9 and in greater detail in FIG. 10, can be performed in the same manner as in FIGS. 5 and 6 with the aid of a spring-loaded bracket 52 supporting the corresponding lens mount 904 flanked by stops 60 and 61. A leadscrew 58, driven by a reversible zoom motor 56 via a step-down transmission 57, is coupled with lens mount 904 by way of a link 59 having an extension 59' which forms with bracket 52 a lost-motion connection; two other link extensions 59" are follower nuts engaged by leadscrew 58. The lens mount 902 for the second component is positively coupled with leadscrew 58 by way to transmission 57. The third component of the varifocal lens group has a lens mount 903 which is displaceable against the force of a spring 51 by a stepped surface 53 of a rotary cam 54, also driven by transmission 57, via a cam follower 55.

If desired, a similar cam drive could be used for lens mount 904 in lieu of the lost-motion connection 52, 59".

It should be understood that my invention can also be used with a varifocal group having positive components 1, 3 and negative components 2, 4.

I claim:

1. In an optical objective system of variable focal length for the projection of images upon a receiving surface, including a varifocal front lens group with at least four components and fixed rear lens means, provided with zooming means for axially shifting certain of said components to vary the overall focal length of the system while maintaining its image plane substantially coincident with said receiving surface,
    the improvement wherein said components include a first component of one refractivity type farthest from said receiving surface, a second component of the opposite refractivity type following said first component, a third component of said one refractivity type following said second component, and a fourth component of said opposite refractivity type between said third component and said rear lens means, said second component being operatively coupled with said zooming means for continuous axial displacement over a varifocal range, said third component being operatively coupled with said zooming means for intermittent axial displacement at a linear rate in said varifocal range, said third component being stationary in a plurality of subranges in each of which said image plane coincides at least once with said receiving surface, said subranges being separated by at least one intervening range segment in which said image plane crosses said receiving surface, said fourth component being operatively coupled with said zooming means for continuous axial displacement parallel to said second component in at least a major part of said varifocal range encompassing said subranges and each intervening range segment.

2. The improvement defined in claim 1 wherein said third component is coupled with said zooming means for displacement at the same rate as said second and fourth components in said intervening range segment.

3. The improvement defined in claim 1 or 2 wherein said second component is coupled with said zooming means for axial displacement in at least one terminal zone of said range in which said third and fourth components are stationary.

4. The improvement defined in claim 1 or 2 wherein said first and third components are negatively refracting, said second and fourth components being positively refracting.

5. The improvement defined in claim 1 or 2 wherein the coupling between said zooming means and at least one of said third and fourth components comprises a lost-motion linkage coacting with fixed stop means for preventing any axial displacement thereof in certain positions of said second component.

6. The improvement defined in claim 1 or 2 wherein the coupling between said zooming means and at least said third component comprises a cam drive.

7. The improvement defined in claim 1 or 2 wherein said zooming means comprises a microprocessor coupled with said second, third and fourth components via respective stepping motors.

8. The improvement defined in claim 1 or 2 wherein said first component is a negative meniscus, said second component consisting of a biconvex singlet and a positive meniscus air-spaced from each other, said third component being a biconcave lens, said fourth component being a biconvex lens.

9. The improvement defined in claim 8 wherein said negative meniscus $L_1$, said biconvex singlet $L_{2a}$, said positive meniscus $L_{2b}$, said biconcave lens $L_3$ and said biconvex lens $L_4$ have radii of curvatures, thicknesses and separations, based on a minimum overall focal length of substantially 12 and a maximum overall focal length of substantially 34.5, along with refractive indices $n_d$ and Abbé numbers $v_d$ substantially as given in the following table:

|  | radii | thicknesses and separations | $n_d$ | $v_d$ |
|---|---|---|---|---|
| $L_1$ | + 581 | 1.3 | 1.78 | 37 |
|  | + 44 |  |  |  |
|  |  | 0–15.1 |  |  |
| $L_{2a}$ | + 50 | 4.9 | 1.61 | 59 |
|  | − 93 |  |  |  |
|  |  | 0.1 |  |  |
| $L_{2b}$ | + 22 | 4.9 | 1.61 | 59 |
|  | + 53 |  |  |  |
|  |  | 14.6–0.1 |  |  |
| $L_3$ | − 57 | 0.8 | 1.79 | 47 |
|  | + 21 |  |  |  |
|  |  | 0.8–15.1 |  |  |
| $L_4$ | + 25 | 3.1 | 1.49 | 70 |
|  | − 49 |  |  |  |

10. The improvement defined in claim 9 wherein said front lens group further comprises a stationary fifth component consisting of a negatively refracting doublet composed of lenses $L_{5a}$ and $L_{5b}$, separated from said biconvex lens $L_4$ by an air space variable between substantially 15.7 and 0.8, said rear lens means consisting of four air-spaced lenses $L_{6a}$, $L_{6b}$, $L_{6c}$ and $L_{6d}$, the lenses $L_{5a}$, $L_{5b}$, $L_{6a}$, $L_{6b}$, $L_{6c}$, $L_{6d}$ having radii of curvatures, thicknesses and separations, refractive indices $n_d$ and Abbé numbers $v_d$ substantially as given in the following table:

|  | radii | thicknesses and separations | $n_d$ | $v_d$ |
|---|---|---|---|---|
| $L_{5a}$ | + 8 | 1.0 | 1.52 | 52 |
|  | + 6 |  |  |  |
| $L_{5b}$ |  | 1.7 |  |  |
|  | + 6 |  |  |  |
|  |  | 8.8 |  |  |
| $L_{6a}$ | + 16 | 1.9 | 1.69 | 53 |
|  | − 16 |  |  |  |
|  |  | 3.8 |  |  |
|  | − 9 |  |  |  |

-continued

| | radii | thicknesses and separations | $n_d$ | $v_d$ |
|---|---|---|---|---|
| $L_{6b}$ | ( | 3.4 | 1.73 | 28 |
| | +18 | | | |
| | | 2.2 | | |

-continued

| | radii | thicknesses and separations | $n_d$ | $v_d$ |
|---|---|---|---|---|
| $L_{6c}$ | ( −14 | 1.7 | 1.70 | 56 |
| | −8 | | | |
| | | 0.1 | | |
| $L_{6d}$ | ( +33 | 1.2 | | |
| | −22 | | | |

* * * * *